(12) United States Patent
Sherlock et al.

(10) Patent No.: US 11,372,709 B2
(45) Date of Patent: *Jun. 28, 2022

(54) AUTOMATED TESTING ERROR ASSESSMENT SYSTEM

(71) Applicant: Pearson Education, Inc., Bloomington, MN (US)

(72) Inventors: James Sherlock, Iowa City, IA (US); Judah Walker, Iowa City, IA (US); James Setaro, Austin, TX (US); Jeffrey Schmidt, North Liberty, IA (US)

(73) Assignee: PEARSON EDUCATION, INC., New York, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 17/008,350

(22) Filed: Aug. 31, 2020

(65) Prior Publication Data

US 2020/0394093 A1    Dec. 17, 2020

Related U.S. Application Data

(63) Continuation of application No. 16/443,676, filed on Jun. 17, 2019, now Pat. No. 10,795,754, which is a
(Continued)

(51) Int. Cl.
  *G06F 11/07* (2006.01)
  *G09B 7/00* (2006.01)
  (Continued)

(52) U.S. Cl.
  CPC ........ *G06F 11/079* (2013.01); *G06F 11/0709* (2013.01); *G06F 11/0748* (2013.01);
  (Continued)

(58) Field of Classification Search
  CPC ............... G06F 11/079; G06F 11/0709; G06F 11/0748; G06F 11/0751; G06F 11/0772;
  (Continued)

(56) References Cited

U.S. PATENT DOCUMENTS

| 2009/0226872 A1* | 9/2009 | Gunther | G09B 7/00 434/350 |
| 2013/0173479 A1* | 7/2013 | Paz Salgado | H04L 41/5074 705/304 |
| 2013/0318469 A1* | 11/2013 | Wessels | G06Q 50/20 715/765 |

* cited by examiner

*Primary Examiner* — Benjamin M Thieu
(74) *Attorney, Agent, or Firm* — Quarles & Brady LLP

(57) ABSTRACT

Methods and systems for automatically resolving computerized electronic communication anomalies are disclosed herein. The system can include a memory including an error database containing information identifying a plurality of previous detected errors and configuration information associated with those errors. The system can include a plurality of user devices. Each of these plurality of user devices can include: a first network interface to exchange data via the communication network; and a first I/O subsystem to convert electrical signals to user interpretable outputs via a user interface. The system can include a server that can: receive an indication of the initiation of electronic communication; receive an electrical signal including attribute information; receive an error message; identify a trend in error messages; and provide an error solution if a trend is identified.

20 Claims, 15 Drawing Sheets

Related U.S. Application Data continuation of application No. 15/349,937, filed on Nov. 11, 2016, now Pat. No. 10,365,962.

(60) Provisional application No. 62/256,099, filed on Nov. 16, 2015.

(51) Int. Cl.
*H04L 41/00* (2022.01)
*H04L 41/0654* (2022.01)
*H04L 41/147* (2022.01)

(52) U.S. Cl.
CPC ...... *G06F 11/0751* (2013.01); *G06F 11/0772* (2013.01); *G06F 11/0793* (2013.01); *G09B 7/00* (2013.01); *H04L 41/00* (2013.01); *H04L 41/0654* (2013.01); *H04L 41/147* (2013.01)

(58) Field of Classification Search
CPC ............. G06F 11/0793; H04L 41/0654; H04L 41/147; G06N 99/005
See application file for complete search history.

AUTOMATED TESTING ERROR ASSESSMENT SYSTEM

CROSS-REFERENCES TO RELATED APPLICATIONS

This application is a continuation of U.S. patent application Ser. No. 16/443,676 filed under the same title on Jun. 17, 2019, which is a continuation of U.S. patent application Ser. No. 15/349,937 filed under the same title on Nov. 11, 2016, now U.S. Pat. No. 10,365,962, which claims the benefit of U.S. Provisional Application No. 62/256,099, filed on Nov. 16, 2015, and entitled "AUTOMATED TESTING ERROR ASSESSMENT SYSTEM," the entirety of which is hereby incorporated by reference herein.

BACKGROUND OF THE INVENTION

This disclosure relates in general to machine learning and alert provision via machine learning. Machine learning is a subfield of computer science that evolved from the study of pattern recognition and computational learning theory in artificial intelligence. Machine learning explores the construction and study of algorithms that can learn from and make predictions on data. Such algorithms operate by building a model from example inputs in order to make data-driven predictions or decisions, rather than following strictly static program instructions.

Machine learning is closely related to and often overlaps with computational statistics; a discipline that also specializes in prediction-making. It has strong ties to mathematical optimization, which deliver methods, theory and application domains to the field. Machine learning is employed in a range of computing tasks where designing and programming explicit, rule-based algorithms is infeasible. Example applications include spam filtering, optical character recognition (OCR), search engines and computer vision. Machine learning is sometimes conflated with data mining, although that focuses more on exploratory data analysis. Machine learning and pattern recognition can be viewed as two facets of the same field. When employed in industrial contexts, machine learning methods may be referred to as predictive analytics or predictive modelling.

While machine learning and alert provision via machine learning are advantageous technologies, new methods and techniques for the application of machine learning and alert provisioning are desired.

BRIEF SUMMARY OF THE INVENTION

One aspect of the present disclosure relates to a system for automatically resolving computerized electronic communication anomalies. The system includes: memory including an error database containing information identifying a plurality of previous detected errors and configuration information associated with those errors. The system includes a plurality of user devices. In some embodiments, some or all of the plurality of user devices includes: a first network interface that can exchange data via the communication network; and a first I/O subsystem that can convert electrical signals to user interpretable outputs via a user interface. The system can include a server. In some embodiments, the server can: receive an indication of the initiation of electronic communication, which indication of the initiation of electronic communication identifies a plurality of users of the plurality of user devices; receive an electrical signal including attribute information identifying one or several attributes of each of the user devices; receive an error message indicating a problem in the electronic communication; identify a trend in error messages by comparing the received error message to gathered error data; and provide an error solution if a trend is identified.

In some embodiments, the memory further includes a user profile database containing information identifying one or several attributes of a user. In some embodiments, the attribute information includes location information, which location information identifies the location of each of the plurality of user devices. In some embodiments, the electronic communication includes test communications. In some embodiments, the test communications include a plurality of questions and a plurality of responses to the plurality of questions.

In some embodiments, the attribute information includes hardware information, which hardware information identifies hardware of each of the plurality of user devices. In some embodiments, the attribute information includes software information, which software information identifies software on each of the plurality of user devices. In some embodiments, the attribute information includes an event log identifying operations performed by each of the plurality of user devices before the problem in electronic communication and identifying software running on each of the plurality of user devices at the time of the problem in the electronic communication.

In some embodiments, providing an error solution includes generating and sending an alert, which alert is sent from the server to the user device. In some embodiments, the alert launches an application within the user device, which application displays data contained in the alert. In some embodiments, the alert includes code to direct the launch of the application at the user device.

One aspect of the present disclosure relates to a method of automatically resolving computerized electronic communication anomalies. The method includes: receiving at a server an indication of the initiation of electronic test from a user device, which indication of the initiation of testing identifies a plurality of testers; receiving at the server an electrical signal including attribute information identifying one or several attributes of each of the user device from the user device; receiving at the server an error message indicating a problem in the testing from the user device; retrieving gathered error data from a memory including an error database including information identifying a plurality of previous detected errors and configuration information associated with those errors; comparing the received error message to the gathered error data; identifying a trend in the error message and the gathered error data based on the comparison of the received error message to the gathered error data; and providing an error solution if a trend is identified.

In some embodiments, the attribute information includes location information, which location information identifies the location of each of the plurality of user devices. In some embodiments, the electronic communication includes test communications. In some embodiments, the test communications include a plurality of questions and a plurality of responses to the plurality of questions.

In some embodiments, the attribute information includes hardware information, which hardware information identifies hardware of each of the plurality of user devices. In some embodiments, the attribute information includes software information, which software information identifies software on each of the plurality of user devices. In some embodiments, the attribute information includes an event log identifying operations performed by each of the plurality of user devices before the problem in electronic communication and identifying software running on each of the plurality of user devices at the time of the problem in the electronic communication.

In some embodiments, providing an error solution includes generating and sending an alert. In some embodiments, the alert is sent from the server to the user device. In some embodiments, the alert launches an application within the user device, which application displays data contained in the alert.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
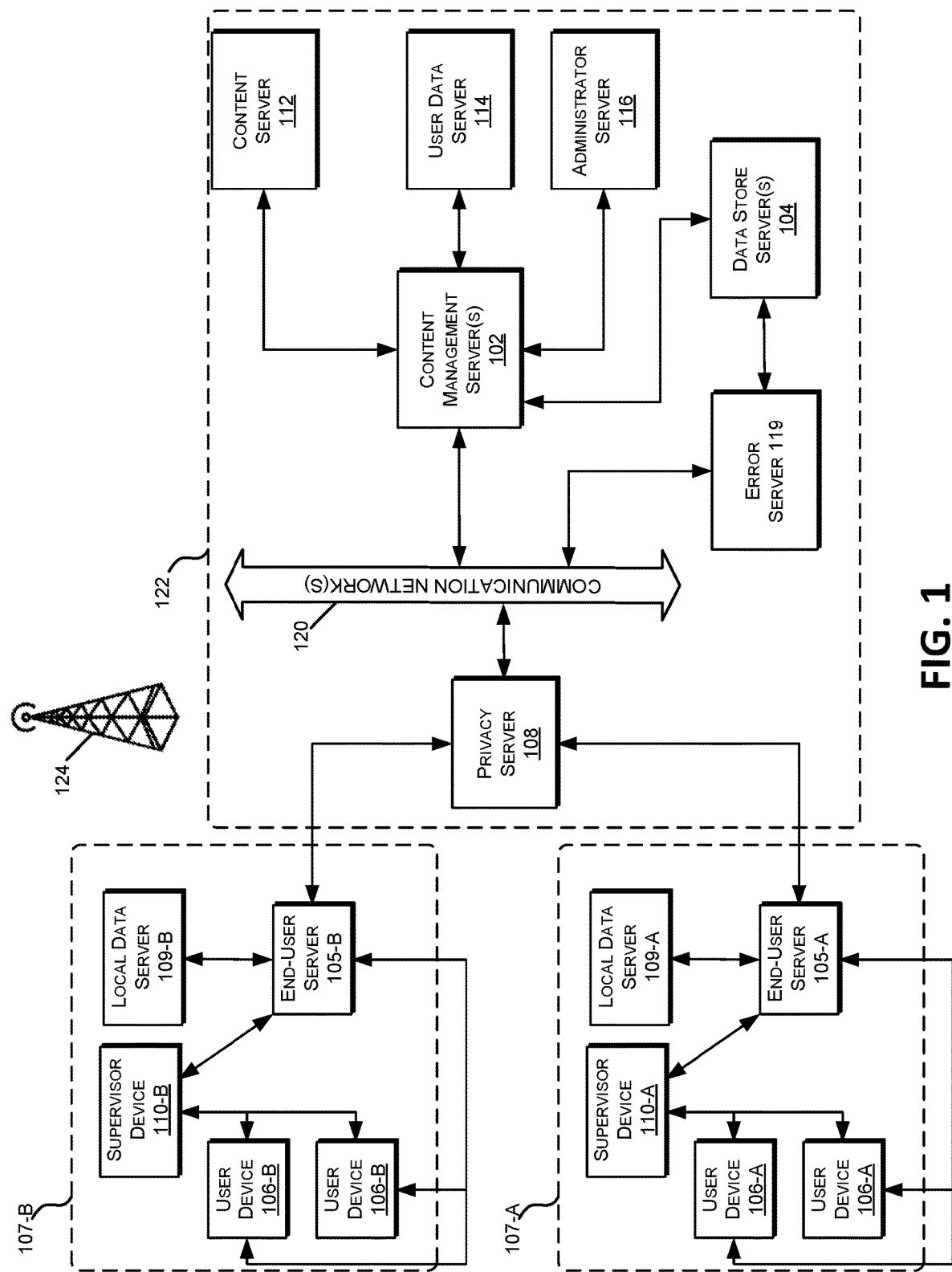
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, also referred to herein as "databases", such as database servers and/or file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the content distribution network 100. Illustrative examples of databases 104 that may be maintained in certain embodiments of the content distribution network 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

The content distribution network 100 can include one or several end-user networks 107. In the embodiment shown in FIG. 1, the content distribution network 100 includes a first end-user network 107-A and a second end-user network 107-B. In some embodiments, one or both of the first and second end-user networks 107-A, 107-B can include the same or different components. In the following discussion, and to the extent that a component is generally discussed, the components of the one or several end-user networks 107 are identified without specifying whether they belong to the first or second end-user network 107-A, 107-B.

In some embodiments, the first and second end-user networks 107-A, 107-B can be at different locations, such as different geographic locations, can be controlled by the same entity or by different entities, can represent political divisions, or the like. In one embodiment, for example, the first end-user network 107-A can be controlled by a first school or school district, and the second end-user network 107-B can be controlled by a second school or school district.

The end-user network 107 can be connected with other components of the content distribution network 100 and/or with other networks within the content distribution network 100. The end-user network 107 of the content distribution network 100 also may include one or more user devices 106 and/or supervisor devices 110. User devices 106 and supervisor devices 110 may display content received via the content distribution network 100, and may support various types of user interactions with the content. In some embodiments, the user devices 106 and the supervisor devices 110 can be configured for computerized testing, and can provide testing content to users of those devices 106, 110. In some embodiments, the computerized testing can include, for example, high-stakes testing, standardized testing, quizzing, or the like. Additionally, in some embodiments, these devices 106, 110 can be configured to track their performance in providing the computerized test to students and can provide data relating to this performance to other components of the content distribution network 100.

User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming system, business or home appliances, and/or a personal messaging devices capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The end-user network 107 of the content distribution network 100 can further include one or several end-user servers 105 and/or one or several local data servers 109 and/or local memories. In some embodiments, the one or several end-user servers 107 can be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. End-user server 105 may include one or more server farms, clusters, or any other appropriate arrangement and/or combination or computer servers. End-user server 105 may act according to stored instructions located in a memory subsystem of the End-user server 105, and may run an operating system, including any commercially available server operating system and/or any other operating systems discussed herein.

The end-user server 105 can be configured to receive content from a content network 122, discussed below, and provide that content to the one or several user devices 106. In some embodiments, the end-user server 105 can be further configured to control and/or direct the operation of some or all of the user devices 106 and supervisor device 110. This can include, for example, directing some or all of the user devices 106 to begin testing and/or to begin providing testing content to their respective users, to end testing and/or to stop providing testing content to their respective users, or the like.

The local data server 109 can be a database server similar to database server 104, and can include, for example, some or all of the hardware and/or software components of the database server 104. The local data server 109 can be configured to store and/or can store a local copy of the content received from the content network 122. The local data server 109 can be initially configured to store one or several communications received from the content network 122 and/or provided to the content network 122. In some embodiments, the local data server 109 can provide a local cache for recent data.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include databases of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, databases, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or several error servers 119. The one or several error servers 119 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Error servers 119 may include one or more server farms, clusters, or any other appropriate arrangement and/or combination or computer servers. Error servers 119 may act according to stored instructions located in a memory subsystem of the error servers 119, and may run an operating system, including any commercially available server operating system and/or any other operating systems discussed herein.

The one or several error servers 119 can be configured to receive one or several communications from one or both of the first and second end-user networks 107-A, 107-B and determine the existence of a testing anomaly. In some embodiments, this testing anomaly can be an anomaly that adversely affects the ability of one or several of the user devices 106 to provide testing content to their respective users. These anomalies can arise from a variety of different sources including, for example, network problems, hardware, software, hardware or software configuration, or the like. In some embodiments, the one or several error servers 119 can be configured to gather data relating to one or several testing anomalies and identifies correspondence between these anomalies. Some examples of a correspondence between anomalies include location of user devices experiencing anomalies in the same geographic region, in the same end-user network 107, having the same hardware or software, the same hardware or software configuration, the same network, the providing of the same testing content, the same type of error, the same error effect, or the like.

Once the correspondence between the anomalies has been detected, the one or several error servers 119 can be configured to generate a remediation recommendation and/or identify a solution to the source of the anomaly. In some embodiments, this can also include generating and/or identifying an adjustment value with which testing scores of students affected by the anomaly can be adjusted.

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

In some embodiments, some of the components of the content distribution network 100 can belong to the content network 122. The content network 122 can include, for example, the content management server 102, the database server 1204, the privacy server 108, the content server 112, the user data server 114, the administrator server 116, and/or the communication network 120. The content network 122 can be the source of content distributed by the content distribution network 100, which content can include, for example, one or several documents and/or applications or programs. These documents and/or applications or programs are digital content. In some embodiments, these one or several documents and/or applications or programs can include, for example, one or several webpages, presentations, papers, videos, charts, graphs, books, written work, figures, images, graphics, recordings, applets, scripts, or the like.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 124.

In some embodiments, navigation system 124 can include or several features that can communicate with one or several components of the content distribution network 100 including, for example, with one or several of the user devices 106 and/or with one or several of the supervisor devices 110. In some embodiments, this communication can include the transmission of a signal from the navigation system 124 which signal is received by one or several components of the content distribution network 100 and can be used to determine the location of the one or several components of the content distribution network 100.

Figure 2:
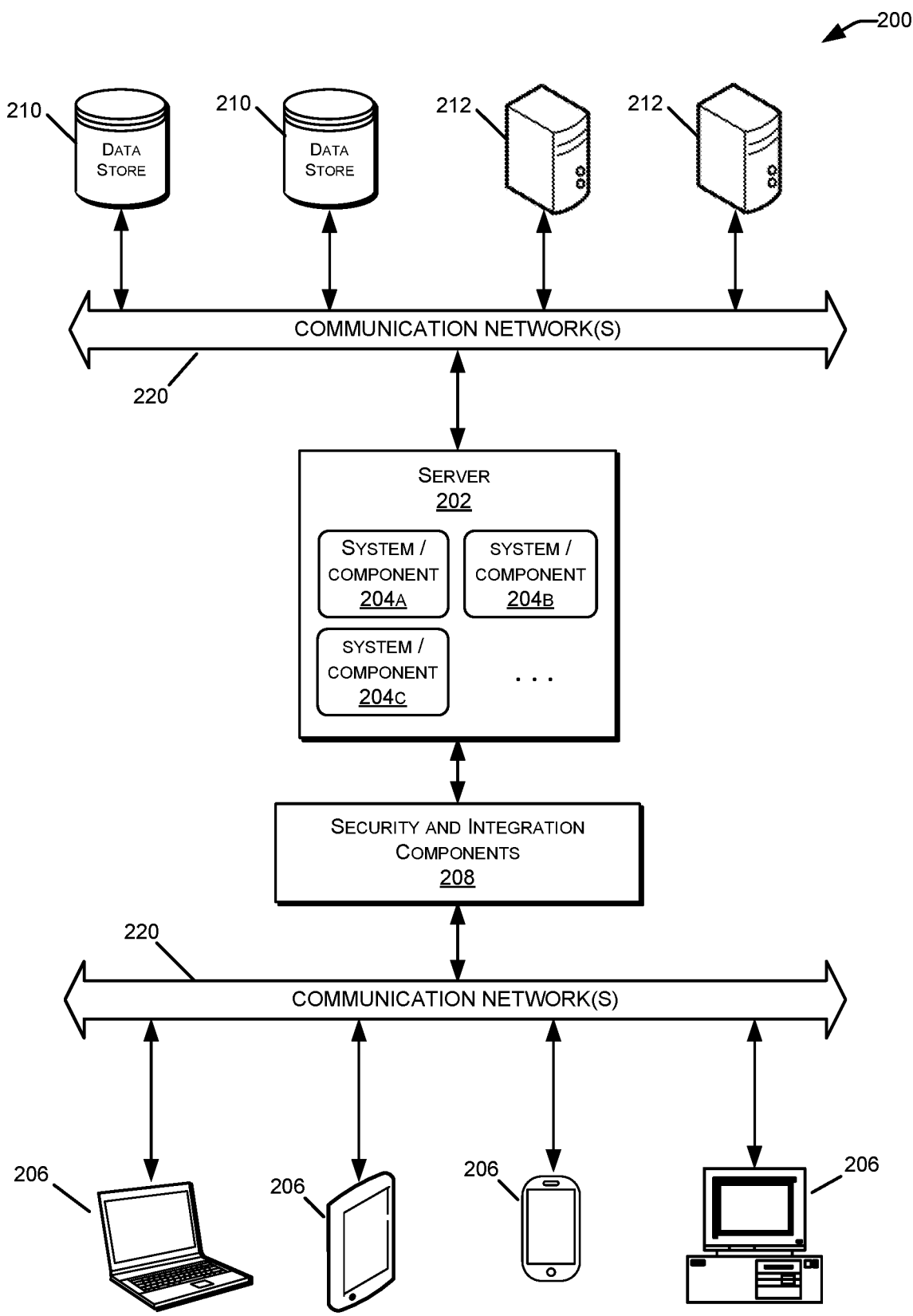
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104, the local data server 109, and/or the customizer data server 128 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN), or may use storage-as-a-service (STaaS) architectural model. In some embodiments, the computing environment can be replicated for each of the networks 107, 122, 104 discussed with respect to FIG. 1 above.

Figure 3:
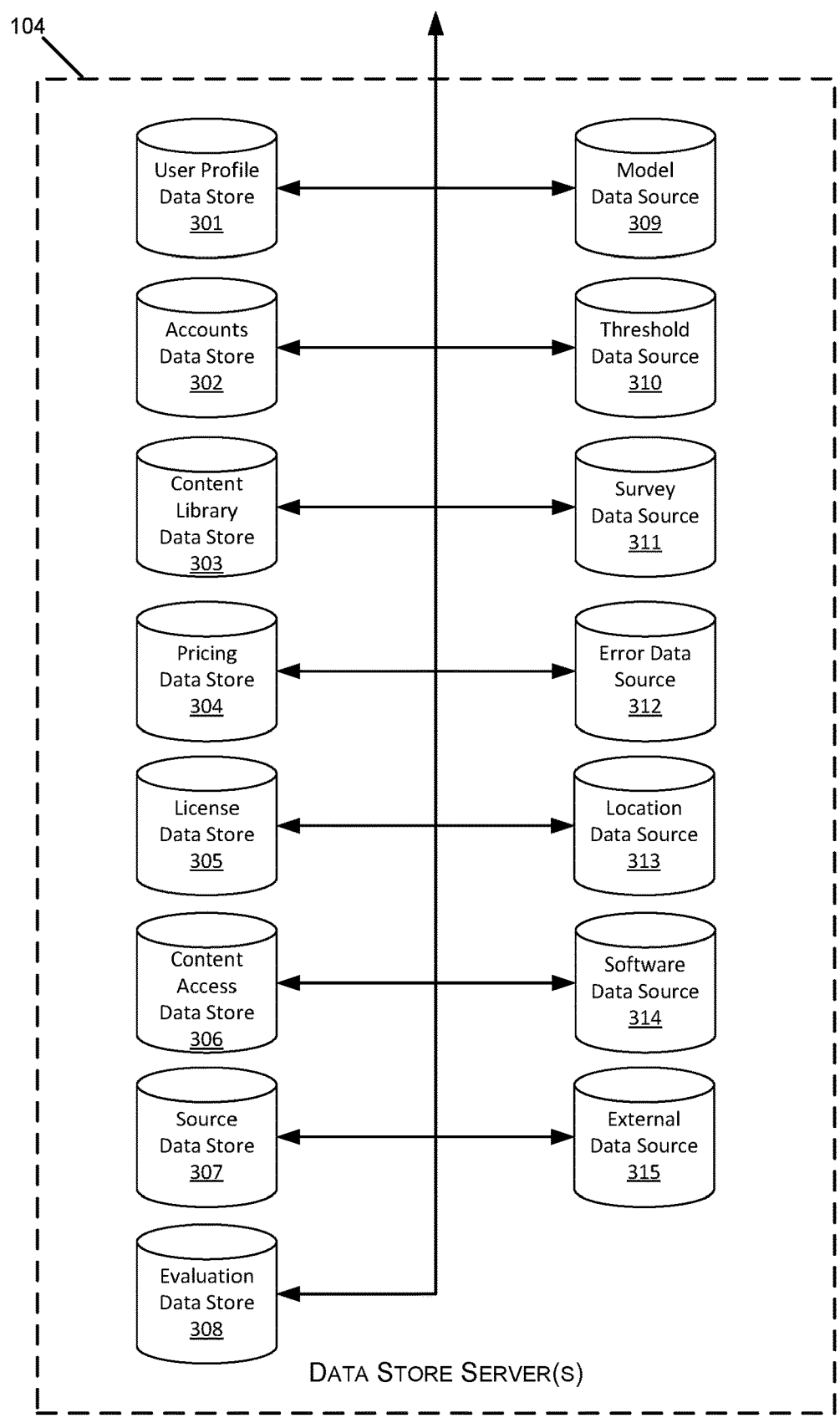
FIG. 3 is a block diagram illustrating an embodiment of one or more data store servers within a content distribution network.

With reference to FIG. 3, an illustrative set of databases and/or database servers is shown, corresponding to the databases servers 104 of the content distribution network 100 discussed above in FIG. 1. One or more individual databases 301-315 may reside in storage on a single computer server 104 (or a single server farm or cluster) under the control of a single entity, or may reside on separate servers operated by different entities and/or at remote locations. In some embodiments, databases 301-315 may be accessed by the content management server 102 and/or other devices and servers within the network 100 (e.g., user devices 106, supervisor devices 110, administrator servers 116, etc.). Access to one or more of the databases 301-315 may be limited or denied based on the processes, user credentials, and/or devices attempting to interact with the database.

The paragraphs below describe examples of specific databases that may be implemented within some embodiments of a content distribution network 100. It should be understood that the below descriptions of databases 301-315, including their functionality and types of data stored therein, are illustrative and non-limiting. Database server architecture, design, and the execution of specific databases 301-315 may depend on the context, size, and functional requirements of a content distribution network 100. For example, in content distribution systems 100 used for professional training and educational purposes, separate databases or file-based storage systems may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listing of available content titles and descriptions, content title usage statistics, subscriber profiles, account data, payment data, network usage statistics, etc.

A user profile data store 301, also referred to herein as a user profile database 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, content authors, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments, this information can identify one or several user memberships in one or several groups such as, for example, a student's membership in a university, school, program, grade, course, class, or the like.

In some embodiments, the user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content distribution network 100.

In some embodiments, the user profile database 301 can include information relating to one or several student-user behaviours including, for example: attendance in one or several courses; attendance and/or participation in one or several study groups; extramural, student group, and/or club involve and/or participation, or the like. In some embodiments, this information relating to one or several student-user behaviours can include information relating to the student-users schedule.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content distribution network 100.

An accounts datastore 302, also referred to herein as an accounts database 302, may generate and store account data for different users in various roles within the content distribution network 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library datastore 303, also referred to herein as a content library database 303, may include information describing the individual content items (or content resources or data packets) available via the content distribution network 100. In some embodiments, the library database 303 may include metadata, properties, and other characteristics associated with the content resources stored in the content server 112. In some embodiments, this data can include the one or several items that can include one or several documents and/or one or several applications or programs. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the data in the content library database 303 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources. In some embodiments, the content library database 303 can be organized such that content is associated with one or several courses and/or programs in which the content is used and/or provided. In some embodiments, the content library database 303 can further include one or several teaching materials used in the course, a syllabus, one or several practice problems, one or several tests, one or several quizzes, one or several assignments, or the like. All or portions of the content library database can be stored in a tier of memory that is not the fastest memory in the content distribution network 100. For example, content relationships may be implemented as graph structures, which may be stored in the library data store 303 or in an additional store for use by selection algorithms along with the other metadata.

In some embodiments, the content library database 303 can comprise information to facilitate in authoring new content. This information can comprise, for example, one or several specifications identifying attributes and/or requirements of desired newly authored content. In some embodiments, for example, a content specification can identify one or several of a subject matter; length, difficulty level, or the like for desired newly authored content.

In some embodiments, the content library database 303 can further include information for use in evaluating newly authored content. In some embodiments, this evaluation can comprise a determination of whether and/or the degree to which the newly authored content corresponds to the content specification, or some or all of the requirements of the content specification. In some embodiments, this information for use in evaluation newly authored content can identify or define one or several difficulty levels and/or can identify or define one or several acceptable difficulty levels. In some embodiments, for example, this information for use in evaluation newly authored content can define a plurality of difficulty levels and can delineate between these difficulty levels, and in some embodiments, this information for use in evaluation newly authored content can identify which of the defined difficulty levels are acceptable. In other embodiments, this information for use in evaluation newly authored content can merely include one or several definitions of acceptable difficulty levels, which acceptable difficulty level can be based on one or several pre-existing difficult measures such as, for example, an Item Response Theory (IRT) value such as, for example, an IRT b value, a p value indicative of the proportion of correct responses in a set of responses, a grade level, or the like.

In some embodiments, this information for use in evaluation newly authored content can further define one or several differentiation and/or discrimination levels and/or define one or several acceptable differentiation and/or discrimination levels or ranges. As used herein, "differentiation" and "discrimination" refer to the degree to which an item such as a question identifies low ability versus high ability users. In some embodiments, this information for use in evaluation newly authored content can identify one or several acceptable levels and/or ranges of discrimination which levels and/or ranges can be based on one or several currently existing discrimination measures such as, for example, a Point-Biserial Correlation.

A pricing database 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the users, and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the content distribution network 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the content distribution network 100 and specific content resources. For example, the content access database 306 may include login information (e.g., user identifiers, logins, passwords, etc.) that can be verified during user login attempts to the network 100. The content access database 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these one or several predictive models can be used to: generate a prediction of the risk of a student-user not achieving one or several predetermined outcomes; generate a prediction of a categorization of the student-user, which categorization can indicate an expected effect of one or several interventions on the student-user; and/or generate a prediction of a priority for any identified intervention.

In some embodiments, the risk model can comprise one or several predictive models based on, for example, one or several computer learning techniques. In some embodiments, the risk model can be used to generate a risk value for a student, which risk value characterizes the risk of the student-user not achieving the predetermined outcome such as, for example, failing to complete a course or course of study, failing to graduate, failing to achieve a desired score or grade, or the like. In some embodiments, the risk model can comprise, for example, a decision tree learning model. In some embodiments, the risk model can generate the risk value through the inputting of one or several parameters, which parameters can be one or several values, into the risk model. These parameters can be generated based on one or several features or attributes of the student-user. The risk model, having received the input parameters, can then generate the risk value.

In some embodiments, the categorization model can determine a category of the student-user. In some embodiments, the cateogization model can be used to generate one or several categorization values or identifiers that identify a category of the student-user. In some embodiments, this category can correspond to a likelihood of an intervention increasing or decreasing the risk value. In some embodiments, the categories can comprise a first category in which an intervention decreases the risk value, a second category in which an intervention increases the risk value, and a third category in which an intervention will not affect the risk value. In some embodiments, this third category can be further divided into a first group in which the student-users will likely fail to achieve the desired outcome regardless of intervention, and a second group in which the student-users will likely achieve the desired outcome regardless of intervention. In some embodiments, the categorization model can determine the category of the student-user through the input of one or several parameters relevant to the student-user into the categorization model. In some embodiments, these parameters can be generated from one or several features or attributes of the student-user that can be, for example, extracted from data relating to the student-user.

In some embodiments, the priority model can determine a priority value, which can be a prediction of the importance of any determined intervention. In some embodiments, this priority model can be determined based on information relating to the student-user for which the priority value is determined. In some embodiments, this priority value can be impacted by, for example, the value of the course associated with the risk value. In some embodiments, for example, the priority value may indicate a lower priority for a risk in a non-essential course. In such an embodiment, priority can be determined based on the credits of a course, based on the relevance of a course to, for example, a degree or major, based on the role of the course as a pre-requisite to subsequent courses, or the like.

A dashboard database 310 can include information for generating a dashboard. In some embodiments, this information can identify one or several dashboard formats and/or architectures. As used herein, a format refers to how data is presented in a web page, and an architecture refers to the data included in the web page and the format of that data. In some embodiments, the dashboard database 310 can comprise one or several pointers to other databases for retrieval of information for inclusion in the dashboard. Thus, in one embodiment, the dashboard database 310 can comprise a pointer to all or portions of the user profile database 301 to direct extraction of data from the user profile database 301 for inclusion in the dashboard.

An intervention data source 311, also referred to herein as an intervention database can include information relating to one or several interventions, also referred to herein as one or several actions. In some embodiments, this information can identify the one or several interventions, and how to implement the one or several interventions. In some embodiments, these interventions can include, for example: a contact such as an email, a text, a telephone call, or an in-person visit; a recommendation such as suggested supplemental material or suggested involvement in a study group; a modification to enrollment or to the student-user schedule, or the like.

In some embodiments, the intervention database 311 can comprise dashboard data. In some embodiments, the dashboard data can include data identifying one or several alternate dashboard formats and/or architectures. In some embodiments, these one or several formats can comprise the resizing and/or rearrangement of one or several items in the dashboard (dashboard items), and the one or several architectures can comprise the addition or subtraction of data from the dashboard and the resizing and/or rearrangement of one or several items in the dashboard.

An error database 312 can include data relating to one or several errors and/or anomalies arising during the communicating of content to and/or from a user device 106. In some embodiments, this communicating of content can include, for example, providing of testing content and/or relating to the providing of testing content. In some embodiments, the error database can include a record of identified errors and/or received error signals, correspondence between the identified errors and/or received error signals, the number of corresponding errors, one or several triggering thresholds, one or several error solutions and/or remediations, or the like. In some embodiments, these errors can identify one or more software errors, delays, crashes, network problems, or the like.

A location database 313 can include information identifying the location of one or several of the user devices 106 used for the communicating of content. In some embodiments, this location can be a geographic location, a political location such as, for example, identifying one or several of the user devices 106 as belonging to one of the end-user networks 107, or the like. The location information can be received from the one or several user devices 106 either prior to the start of testing, or during testing.

A software database 314 can include information identifying hardware and/or software used for the communicating of content. Specifically, this can identify the hardware and/or software, including the hardware and/or software configuration for one or several of the user devices 106 used for the communicating of content, and specifically used for testing. This can include, for example, identification of an operation system, processor, modem, router, internet connection, antivirus software, security software, web browser, or the like. This information can be received from the one or more user devices either prior to the start of testing, or during testing.

In addition to the illustrative databases described above, database server(s) 104 (e.g., database servers, file-based storage servers, etc.) may include one or more external data aggregators 315. External data aggregators 315 may include third-party data sources accessible to the content management network 100, but not maintained by the content management network 100. External data aggregators 315 may include any electronic information source relating to the users, content resources, or applications of the content distribution network 100. For example, external data aggregators 315 may be third-party databases containing demographic data, education related data, consumer sales data, health related data, and the like. Illustrative external data aggregators 315 may include, for example, social networking web servers, public records databases, learning management systems, educational institution servers, business servers, consumer sales databases, medical record databases, etc. Data retrieved from various external data aggregators 315 may be used to verify and update user account information, suggest user content, and perform user and content evaluations.

Figure 4A:
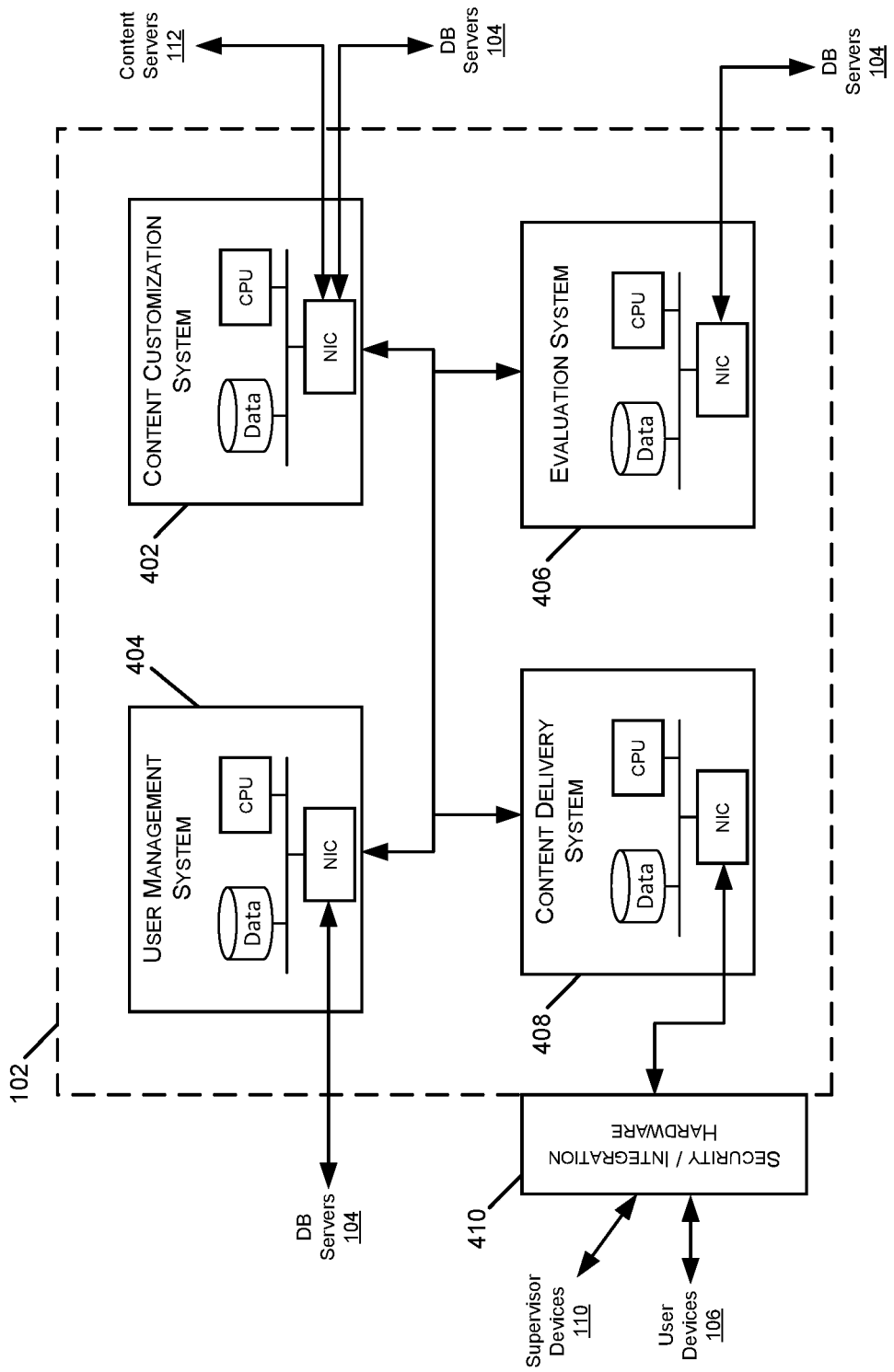
FIG. 4A is a block diagram illustrating an embodiment of one or more content management servers within a content distribution network.

With reference now to FIG. 4A, a block diagram is shown illustrating an embodiment of one or more content management servers 102 and/or error servers 119 within a content distribution network 100. As discussed above, content management server(s) 102 and/or error server(s) 119 may include various server hardware and software components that manage the content resources within the content distribution network 100 and provide interactive and adaptive content to users on various user devices 106. For example, content management server(s) 102 and/or error server(s) 119 may provide instructions to and receive information from the other devices within the content distribution network 100, in order to manage and transmit content resources, user data, and server or client applications executing within the network 100.

A content management server 102 and/or error server 119 may include a content customization system 402. The content customization system 402 may be implemented using dedicated hardware within the content distribution network 100 (e.g., a content customization server 402), or using designated hardware and software resources within a shared content management server 102 and/or error server 119. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), previous user results and content evaluations (e.g., from an evaluation data store 308), and/or the like. Based on the retrieved information from databases 104 and other data sources, the content customization system 402 may modify content resources for individual users.

In some embodiments, the content management system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can use the evidence model to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 and/or error server 119 also may include a user management system 404. The user management system 404 may be implemented using dedicated hardware within the content distribution network 100 (e.g., a user management server 404), or using designated hardware and software resources within a shared content management server 102 and/or error server 119. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or datastore servers 104 to retrieve user data such as associated content compilations or programs, content completion status, user goals, results, and the like.

A content management server 102 and/or error server 119 also may include an evaluation system 406, also referred to herein as a response processor. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106 via, for example, the end-user server 105. For example, various ratings of content resources submitted by users may be compiled and analyzed, and then stored in a database (e.g., a content library database 303 and/or evaluation database 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the evaluation system 406 can be further configured to receive one or several responses from the user and to determine whether the one or several response are correct responses, also referred to herein as desired responses, or are incorrect responses, also referred to herein as undesired responses. In some embodiments, one or several values can be generated by the evaluation system 406 to reflect user performance in responding to the one or several data packets. In some embodiments, these one or several values can comprise one or several scores for one or several responses and/or data packets.

A content management server 102 and/or error server 119 also may include a content delivery system 408. The content delivery system 408 may be implemented using dedicated hardware within the content distribution network 100 (e.g., a content delivery server 408), or using designated hardware and software resources within a shared content management server 102 and/or error server 119. The content delivery system 408 can include a presentation engine that can be, for example, a software module running on the content delivery system.

The content delivery system 408, also referred to herein as the presentation module or the presentation engine, may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 4B:
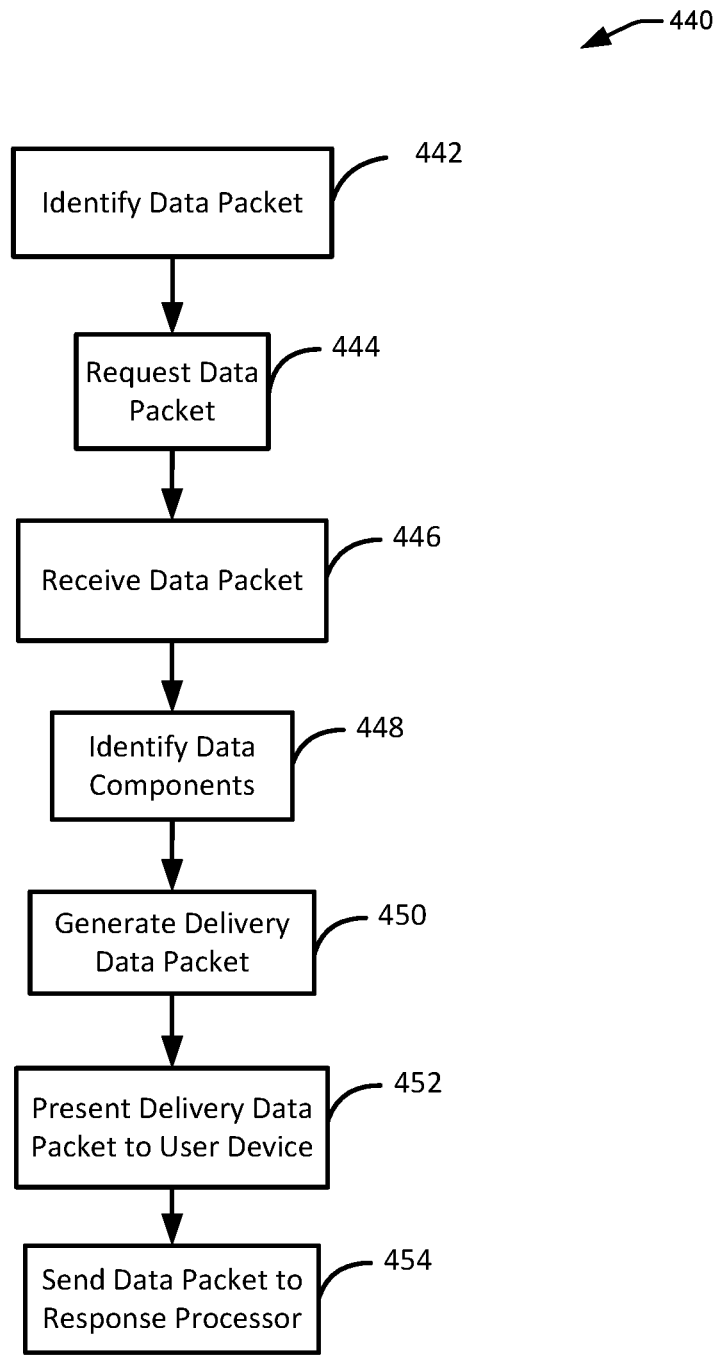
FIG. 4B is a flowchart illustrating one embodiment of a process for data management.

With reference now to FIG. 4B, a flowchart illustrating one embodiment of a process 440 for data management is shown. In some embodiments, the process 440 can be performed by the content management server 102, and more specifically by the content delivery system 408 and/or by the presentation module or presentation engine. The process 440 begins at block 442, wherein a data packet is identified. In some embodiments, the data packet can be a data packet for providing to a student-user, and the data packet can be identified by determining which data packet to next provide to the user such as the student-user. In some embodiments, this determination can be performed by the content customization system 402 and/or the recommendation engine.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the content delivery system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is presented to the user device 106. In some embodiments, this can include providing the delivery data packet to the user device 106 via, for example, the communication network 120.

After the delivery data packet has been provided to the user device, the process 440 proceeds to block 454, wherein the data packet and/or one or several components thereof is sent to and/or provided to the response processor. In some embodiments, this sending of the data packet and/or one or several components thereof to the response processor can include receiving a response from the student-user, and sending the response to the student-user to the response processor simultaneous with the sending of the data packet and/or one or several components thereof to the response processor. In some embodiments, for example, this can include providing the response component to the response processor. In some embodiments, the response component can be provided to the response processor from the content delivery system 408.

Figure 4C:
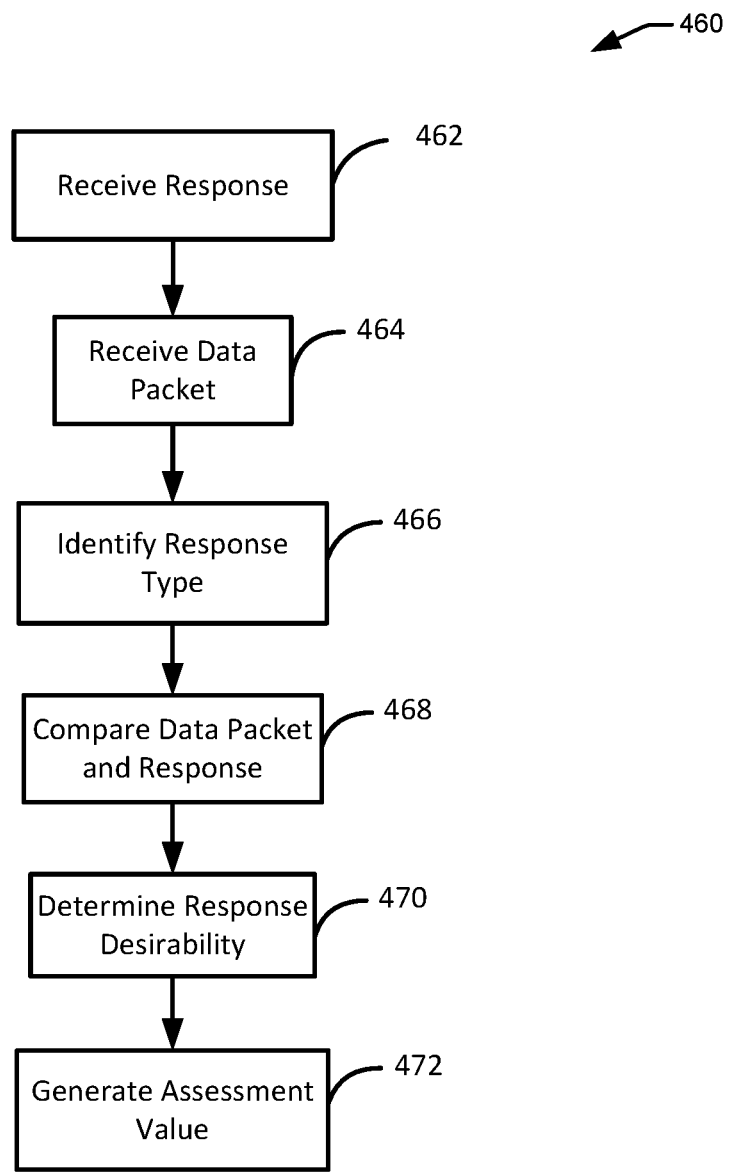
FIG. 4C is a flowchart illustrating one embodiment of a process for evaluating a response.

With reference now to FIG. 4C, a flowchart illustrating one embodiment of a process 460 for evaluating a response is shown. In some embodiments, the process can be performed by the evaluation system 406. In some embodiments, the process 460 can be performed by the evaluation system 406 in response to the receipt of a response from the user device 106.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more a plurality of responses. This assessment value can be stored in one of the databases 104 such as the user profile database 301.

Figure 5:
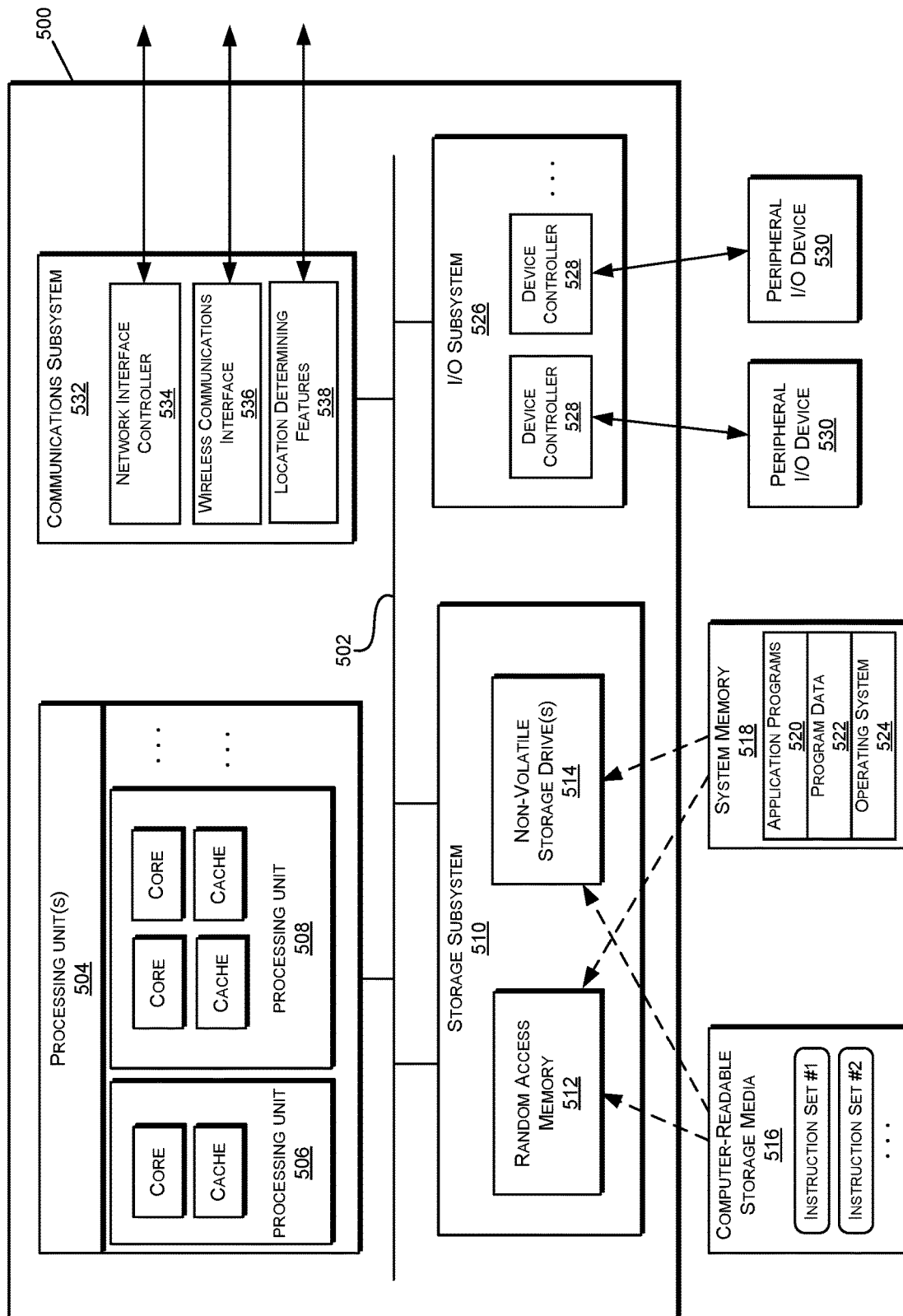
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 315). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
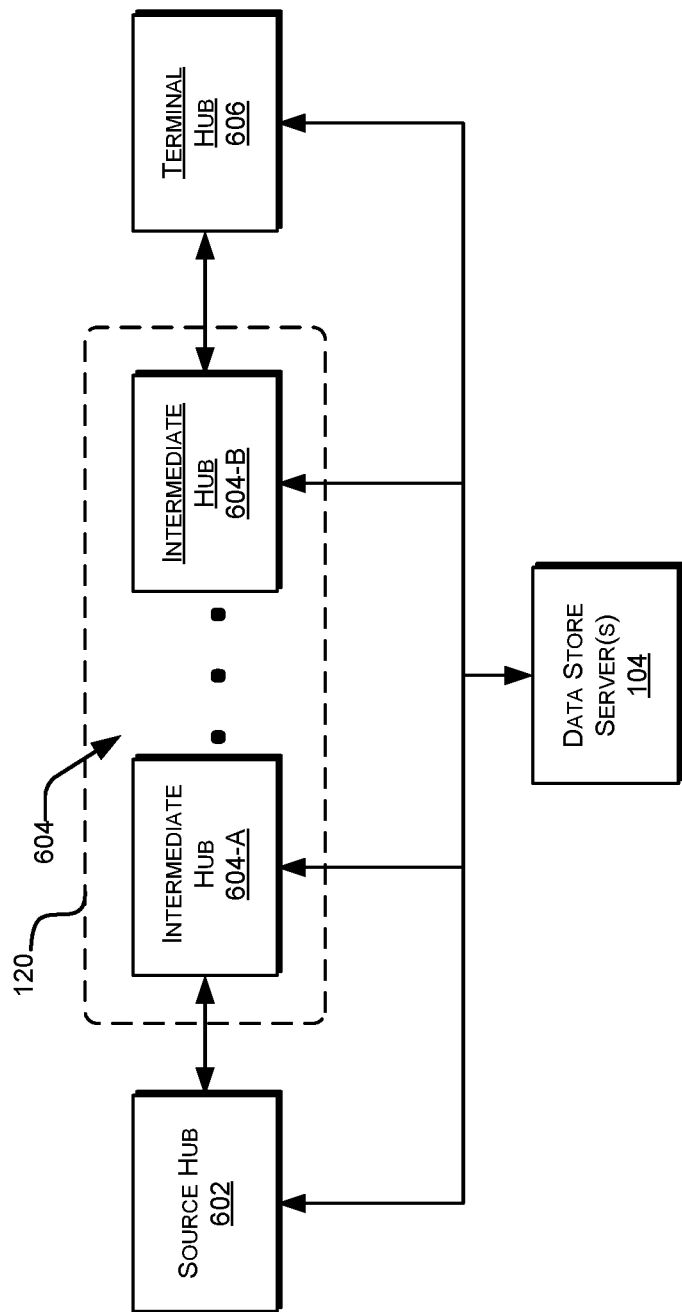
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
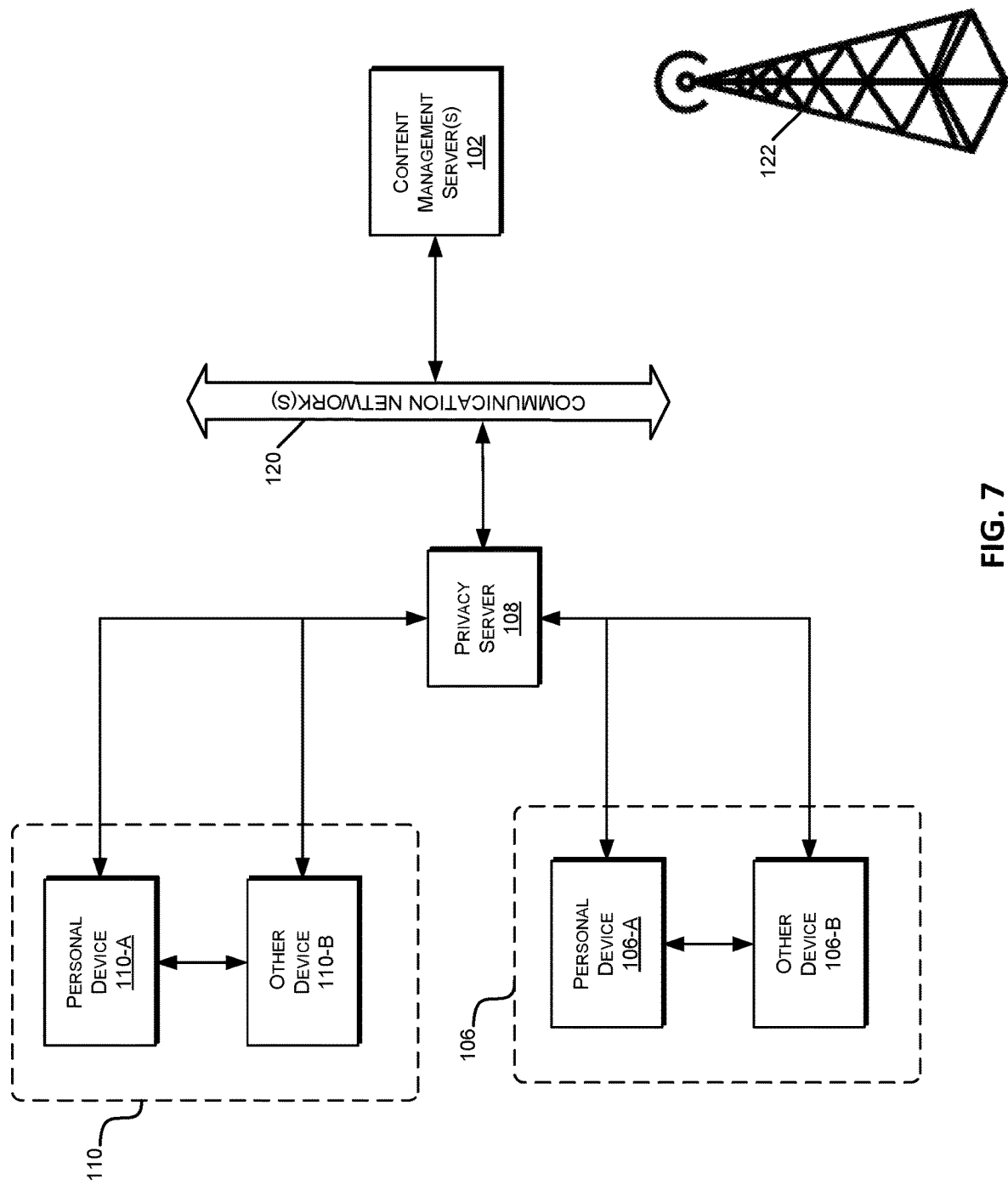
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
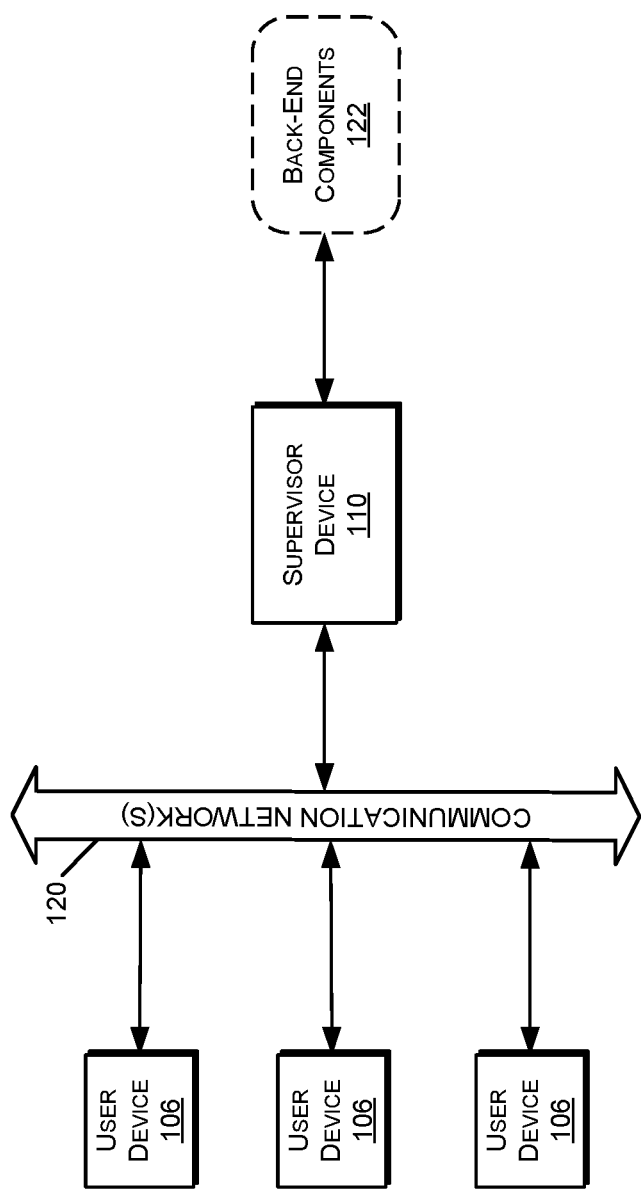
FIG. 8 is a block diagram illustrating one embodiment of networked devices including a user device and a supervisor device.

With reference now to FIG. 8, a block diagram illustrating one embodiment of the connection of user devices 106 to a supervisor device 110 is shown. In some embodiments, one or several of the user devices 106 can be connected to a supervisor device 110 in a classroom environment and/or to form a virtual classroom. In embodiments in which the devices 106, 110 are connected to form a virtual classroom, the devices can be connected via, for example, a WAN, a cellular network, a telephone communication network, or the like.

In embodiments in which the devices 106, 110 are connected in a classroom environment. In such a classroom environment, the user devices 106 and the supervisor device 110 can be connected to each other via, for example, a Local Area Network (LAN). This configuration can facilitate the quick transfer of data between the devices 106, 110 and can increase the speed with which survey data can be provided to the user devices 106 and survey data can be received form the user crevices 106 and provided to the supervisor device 110. In some such embodiments, the supervisor device 110 can be further connected with the back-end components 122 and can serve as a conduit for survey data from the user devices 106 to the back-end components 122. In such an embodiment, the supervisor device 110 can receive survey data from the user devices 106, can identify some or all of the survey data for local analysis, and can provide all of the survey data or the data not identified for local analysis to the back-end components 122. The supervisor device 110 can additionally, in some embodiments, locally analyze the portion of the survey data identified for local analysis and can use the analysis of this portion of the survey data to generate and provide one or more recommendations relating to content being delivered to the users of the user devices 106.

Figure 9:
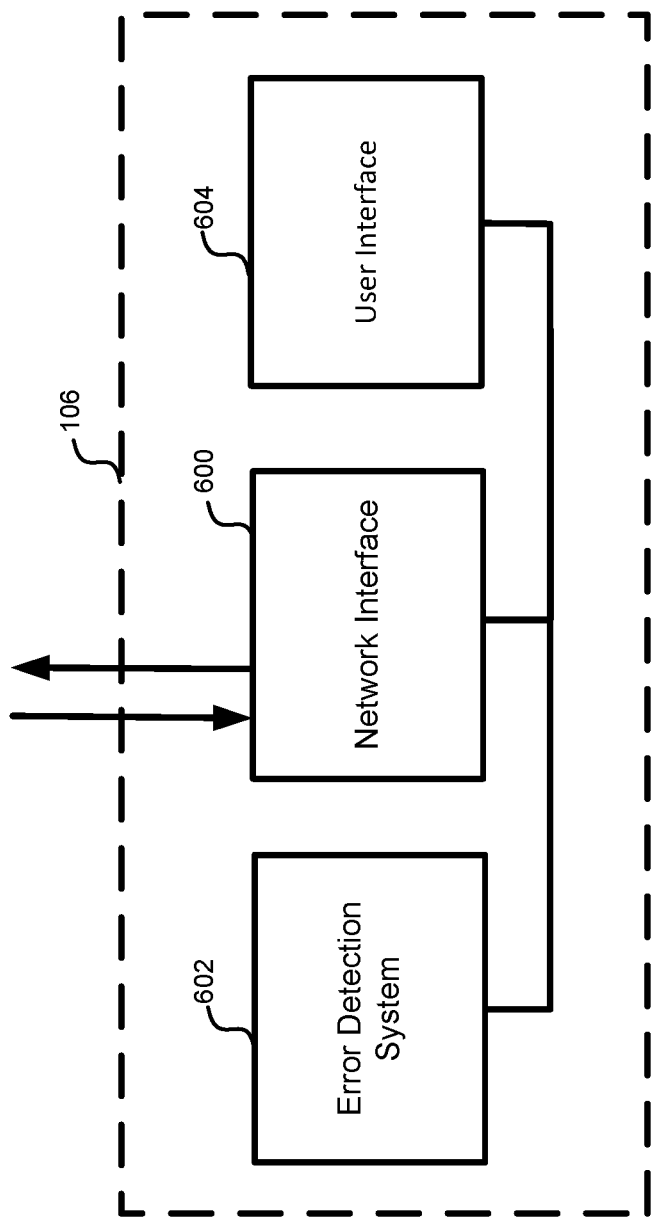
FIG. 9 is a schematic illustration of one embodiment of a user device for use with a content distribution network.

With reference now to FIG. 9, a block diagram of one embodiment of the end-user server 105 and/or the user device 106 is shown. As discussed above, the end-user server 105 and/or the user device 106 can be configured to provide information to and/or receive information from other components of the content delivery network 100. The end-user server 105 and/or the user device can 106 access the content delivery network 100 through any desired means or technology, including, for example, a webpage such as, for example, a social network service page, or a web portal. As depicted in FIG. 9, the end-user server 105 and/or the user device 106 can include a network interface 600. The network interface 600 allows the end-user server 105 and/or user device 106 to access the other components of the content delivery network 100. The network interface 600 can include features configured to send and receive information, including, for example, an antenna, a modem, a transmitter, receiver, or any other feature that can send and receive information. The network interface 600 can communicate via telephone, cable, fiber-optic, or any other wired communication network. In some embodiments, the network interface 600 can communicate via cellular networks, WLAN networks, or any other wireless network.

The end-user server 105 and/or the user device 106 can include, for example, an error detection engine 602. The error detection engine 602 can be configured to detect an error in the presentation of testing content to a user. In some embodiments, an error, also referred to herein as an anomaly or a detrimental anomaly, can include, for example, a delay in providing testing content, a stoppage of the delivery of the testing content, the performing of an unauthorized operation by the user device 106, a loss of network connectivity, a firewall problem, a security and/or authorization problem, or the like. In some embodiments, the error detection engine 602 can comprise thresholds indicative of normal operation and can compare current operation levels to those thresholds to identify one or several errors. Alternatively, errors can be detected in any other known manner.

The end-user server 105 and/or the user device 106 can include a user interface 604 that communicates information to, and receives inputs from, a user. The user interface 604 can include a screen, a speaker, a monitor, a keyboard, a microphone, a mouse, a touchpad, a keypad, a touchscreen, or any other feature or features that can receive inputs from a user and provide information to a user.

Figure 10:
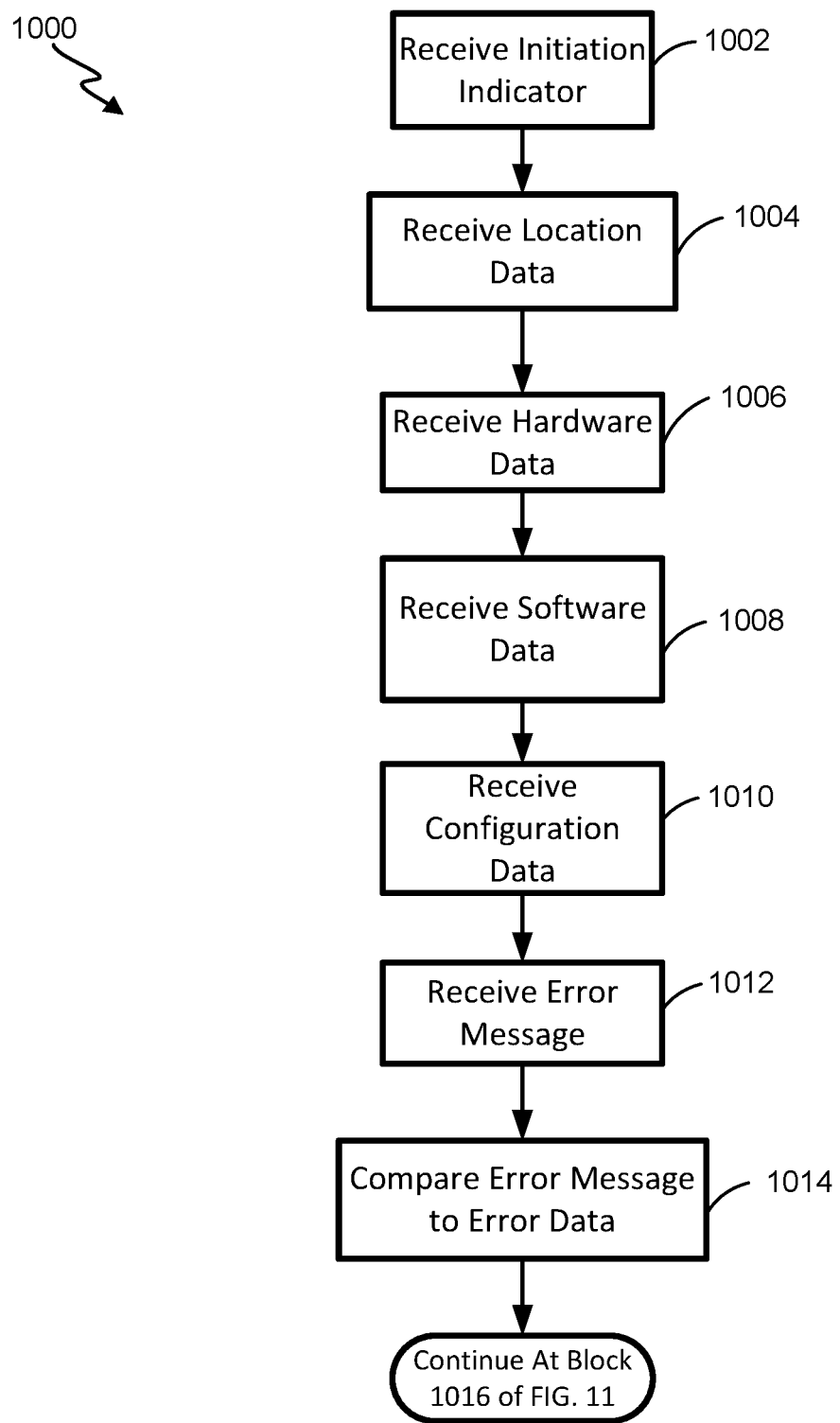
FIG. 10 is a first part of a flowchart illustrating one embodiment of a process for automatic electronic communication error detection and remediation.
Figure 11:
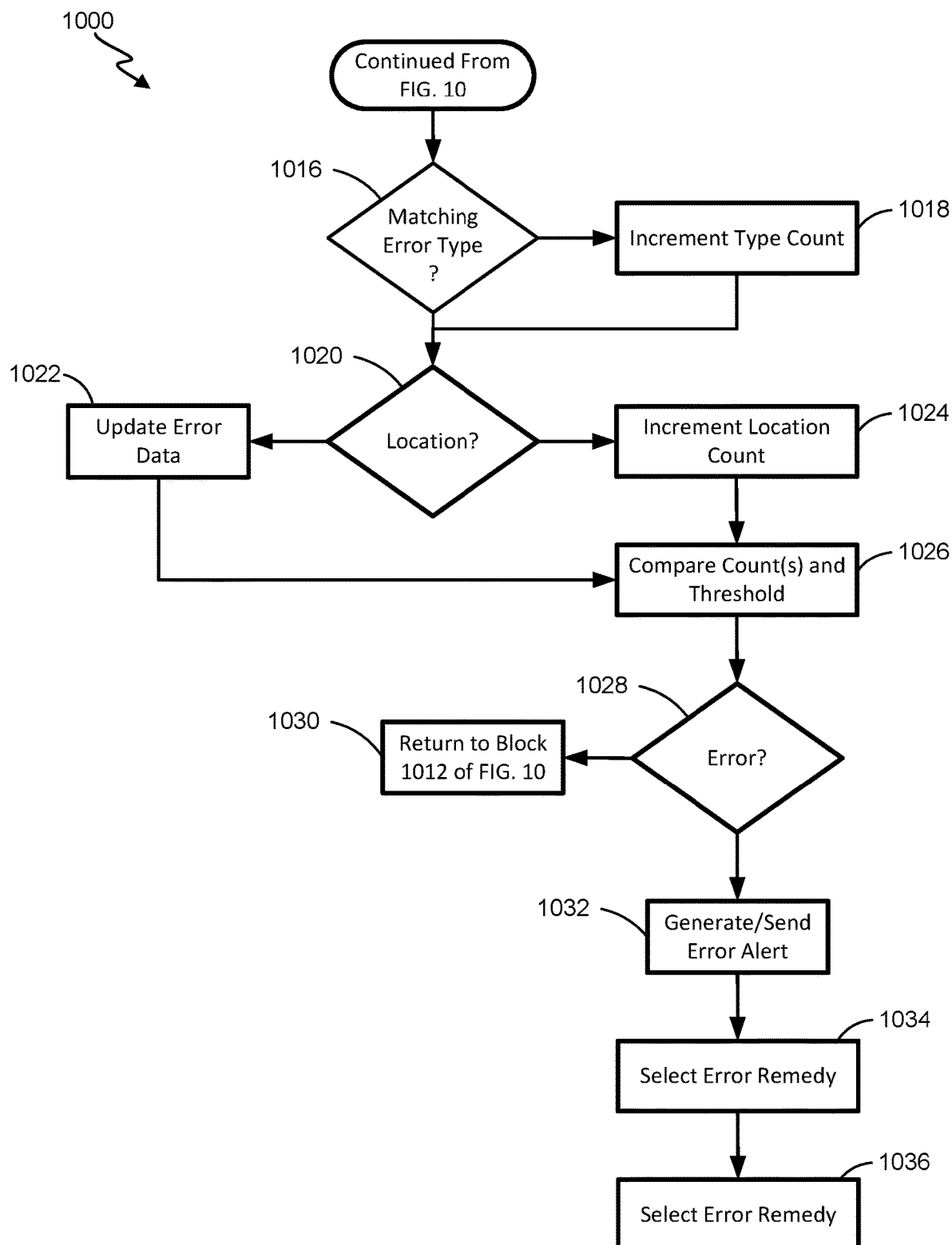
FIG. 11 is a second part of the flowchart illustrating one embodiment of the process for automatic electronic communication error detection and remediation

With reference now to FIGS. 10 and 11, a flowchart illustrating one embodiment of a process 700 for automatic electronic communication error detection and remediation is shown. In some embodiments, automatic electronic communication error detection and remediation can include automatic testing error detection and remediation. In some embodiments, automatic electronic communication error detection and remediation can be performed to automatically identify and/or remedy errors and/or events that interfere with the delivery of content to a user device 106 and/or from the user device 106. In some embodiments, this can include, for example, one or several software, hardware, and/or network errors or events. In some embodiments in which the electronic communication comprises a test, these errors can prevent and/or interfere with delivery and/or communication of one or several test data packets, prevent and/or interfere with response to one or several test data packets, or the like. In some embodiments, this can degrade the quality of electronic communication and/or affect the reliability of the test in identifying a skill level.

The process 1000 can begin at block 1002, wherein an initiation indicator is received. In some embodiments, this indicator can indicate the start of electronic communication, and specifically can indicate the start of testing. In some embodiments, the initiation indicator can comprise an electronic message that can, for example, comprise one or several values. In some embodiments, this indication can be received by the error server 119 in response to the providing of testing content to the student, which testing content was received by the user device 106 from the content management server 102. After the indication of the initiation of electronic communication has been received, the process 1000 proceeds to block 1004, wherein location data, also referred to herein as location information is received. In some embodiments, this location information can be received from the user device 106 and can identify, for example, the geographic location of the user device, the end-user network 107 to which the user device 106 belongs, or the like. In some embodiments, this location information can be generated by the user device 106 via, for example, the navigation system 124, and in some embodiments, this location information can be stored in memory of the user device 106. The location information can be received via an electronic signal at the error server 119.

After the location information has been received, the process 1000 proceeds to block 1006, wherein the hardware information is received. In some embodiments, the hardware information can be received in the form of an electronic signal by the error server 119 from the user device 106. The hardware information can identify the hardware of the user device 106, and/or of the end-user network 107 to which the user device 106 belongs. In some embodiments, the hardware information further identifies any hardware unique to the communication network 120 via which the end-user network 107 connects to the content network 122.

After the hardware information has been received, the process 1000 proceeds to block 1008, wherein software information is received. In some embodiments, the software information can identify the software running on the user device 106 and/or on the end-user server 105 of the end-user network 107. This software can include, for example, the operating system software, the software delivering the testing content, any security and/or antivirus software, web browsing software, or the like. The software information can be received by the error server 119 from the user device 106 via an electrical signal.

After the software information has been received, the process 1000 proceeds to block 1010, wherein configuration information is received. In some embodiments, the configuration information can identify one or several configurations of software and/or hardware of the user device 106 or of the other components of the end-user network 107. The configuration information can include information relating to, for example, one or several firewall settings, one or several security level settings, one or several modes of operation such as, for example, screen resolution and/or color resolution levels, memory allocation to RAM, or the like.

After the configuration information has been received, the process 1000 proceeds to block 1012, wherein an error message, also referred to herein as a feedback communication, is received. The error message can specify one or several errors occurring during the electronic communication, and specifically during presentation of testing content and/or during the testing. In some embodiments, the error message can be generated by the user device 106, and specifically can be generated by the error detection system 602 of the user device 106 and can be provided to the error server 119 in the form of an electrical signal. The error message can include data indicative of the error. This data can identify, for example, an error code, and error type, an effect of the error, potential sources of the error including, for example, the starting on a non-approved software, or the like.

After the error message is received, the process 1000 proceeds to block 1014, wherein the error message is compared to the error data. In some embodiments, this step can include retrieving error data from the error database 312, and then identifying any correspondences between the error message and the error data. After the error message has been compared with the error data, the process 1000 proceeds to decision state 1016, located on FIG. 11, wherein it is determined whether the at least one of the one or more errors identified in the error message is the same type of error as identified in the error data. In some embodiments, this can include determining whether any correspondence was identified between the at least one or more errors identified in the error message and the errors identified in the error data. Specifically, this can be performed to determine whether one or several errors and/or types of errors a recurring and/or the frequency of the recurrence of these one or several errors.

If it is determined that the same type of error was identified in the error message and in the error data, then the process proceeds to block 1018, wherein a count associated with the identified error type is incremented. In some embodiments, for example, this count can track the number of corresponding and/or matching errors. This count can be stored in one of the databases 104, and can be specifically stored in the error database 312.

After the count has been incremented, or returning again to decision state 1016, if it is determined that the errors in the error message and in the error data are not the same type, then the process 1000 proceeds to identify the existence of any error correlations. In some embodiments, this can include determining if the errors are associated with, for example, one or several attributes such as: location of the user devices 106 experiencing the errors; the type of electronic communication and/or electronic content associated with the error; the test associated with the error; the question type and/or response type associated with the error; the code in which the content is written; embedded code within the content; a test form; software and/or hardware requirements of the user device 106 associated with the error; processes on the user device 106 at the time of the error; the question and/or response associated with the error; one or several of the date, day of the week, and/or time of the error; or the like. In some embodiments, this can include, for example, identifying commonalities in attributes associated with the errors and/or error data and determining the statistical significance of these commonalities. In some embodiments, this statistical significance can be measured in the form of a comparison of a threshold to a count of the number of errors associated with the attribute, and in some embodiments, this can include one or several measures of statistical significance that normalize for the sample size, such as, for example, a percent of users sharing a common attribute that experience an error. One example of steps for determining an error correlation is shown in FIG. 11 with respect to 1020-1028. In these steps, the common attribute that is evaluated is a location, although it will be appreciated that any of the above-mentioned attributes can be likewise evaluated.

After the count has been incremented, or returning again to decision state 1016, if it is determined that the errors in the error message and in the error data are not the same type, then the process 1000 proceeds to decision state 1020, wherein it is determined if the errors of the error message and the error data occurred in the same location. In some embodiments, this can include determining whether multiple errors occurred within a predetermined distance of one another, or alternatively, determining if multiple errors occurred within a single end-user network 107, occurred with a single connectivity provider and/or with a single communications network provider, or the like.

If it is determined that the errors of the error message and the error data did not occur in the same location, the process 1000 proceeds to block 1022, wherein the error data is updated with information relating to the one or several errors identified in the error message. In some embodiments, the error data can be updated in one of the databases 104, and particularly in the error database 312.

After the error data has been updated, or returning again to decision state 1020, if it is determined that the errors in the error message and in the error data occurred occur at the same location, the process 1000 proceeds to block 1024, wherein a location count associated with the identified error location is incremented. In some embodiments, for example, this location count can track the number of corresponding and/or matching errors, and specifically the number of errors occurring at the same location. This location count can be stored in one of the databases 104, and can be specifically stored in the error database 312

After the location count has been incremented, or returning to block 1022, after the error data is updated, the process 1000 proceeds to block 1026, wherein the counts, and specifically, wherein the type count and/or the location count are compared to the location and/or type counts. This can include determining whether the value for the count is larger than threshold values. After the count has been compared to the threshold values, the process 1000 proceeds to decision state 1028 wherein it is determined if the count exceeds the threshold value. If the count does not exceed the threshold value, then the process 1000 proceeds to block 1030, and can terminate, or alternatively, can wait until the receipt of a next or additional error message, at which point the process 1000 can return to block 1012 and proceed as outlined above.

Returning again to decision state 1028, if it is determined that the count exceeds the threshold value, then the process 1000 proceeds to block 1032, wherein an error warning and/or alert is generated and/or sent. In some embodiments, the error warning can comprise a message identifying one or several key aspects of the corresponding errors including, for example, one or several testers affected by the error, one or several tests affected by the error, one or several test questions affected by the error, or the like. In some embodiments, the error alert can be generated and/or sent by one of the servers of the content distribution network 100 such as, for example, one of the end-user servers 105-A, 105-B, the error server 119, and/or the server 102. In some embodiments, In some embodiments, one or more alerts can be sent to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert. In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device. In some embodiments, the alert can comprise data identifying one or several errors and/or one or several attributes associated with the errors.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

After the error warning has been generated, the process 1000 proceeds to block 1034, wherein a remedy is selected. In some embodiments, this remedy, also referred to herein as a proposed remedy, can be a solution, or a suggested solution to the underlying cause of the error. This can include, for example, a restarting of affected user devices 106, a re-establishment of network connections, a reconfiguration of software or hardware, a removal of hardware or software, or the like. This remedy can be selected based on information in the error message and based on remedy information that can be stored in the error database.

After the remedy has been selected, the process 1000 proceeds to block 1036, wherein the remedy is provided to a user. In some embodiments, the user recipient of the remedy can be the tester using an affected user device 106, a system administrator, or the like. In some embodiments in which the tester using the affected user device 106 is the user recipient, the remedy can be provided via the tester's user device 106. In some embodiments, the remedy can be provided to the user as part of the error alert, and in some embodiments, the remedy can be provided to the user separate from the error alert.

Figure 12:
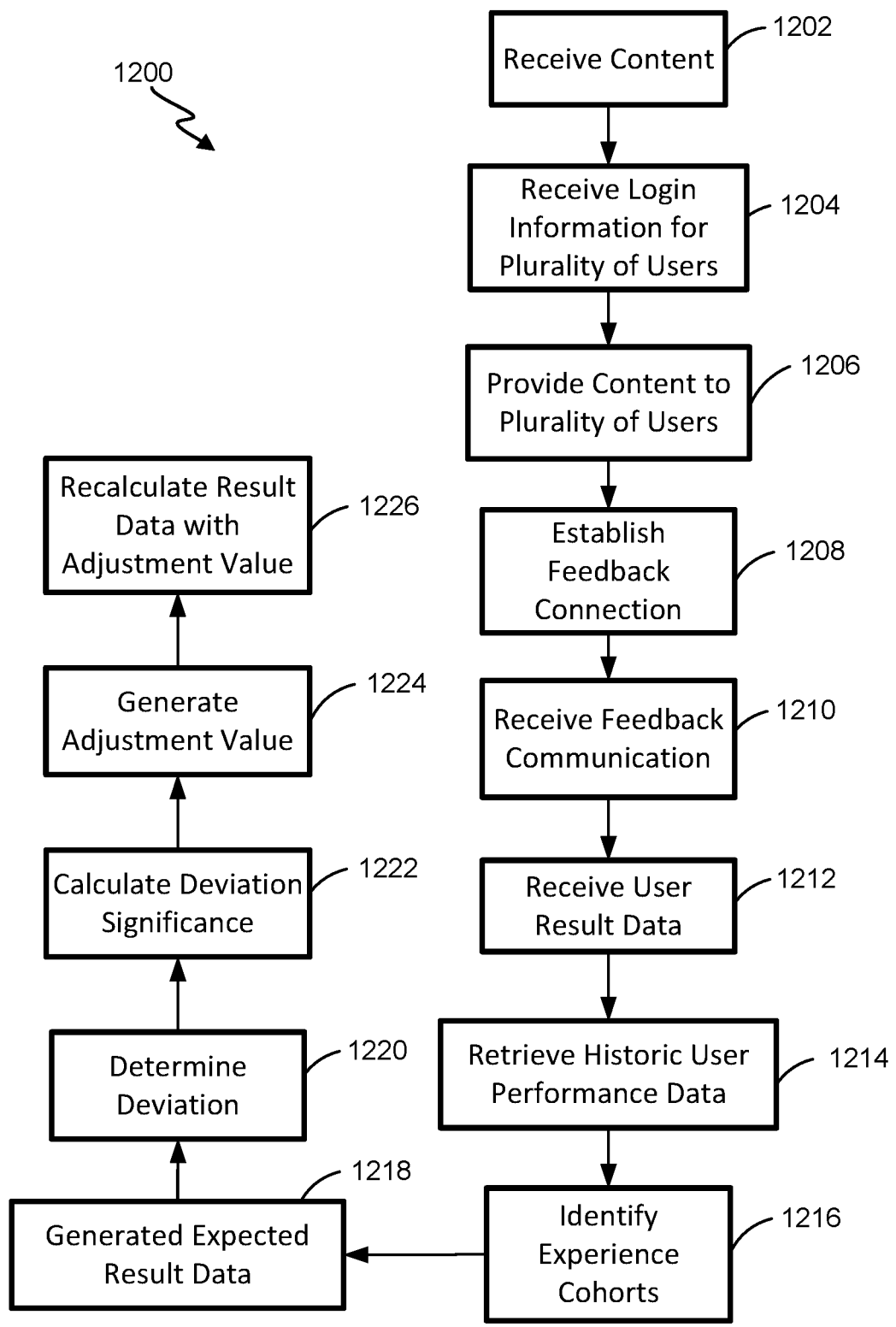
FIG. 12 is a flowchart illustrating one embodiment of a process for generating a performance adjustment based on a detected electronic communication error.

With reference now to FIG. 12, a flowchart illustrating one embodiment of a process 1200 for generating a performance adjustment based on a detected error, such as a detected testing error, is shown. In some embodiments, this process 1200 can be performed to gather information relating to a user's performance and how one or several errors affected the user's performance. In some embodiments, this process 1200 can be further used in, for example, in low-stakes testing.

The process 1200 begins at block 1202, wherein content such as, for example, a test, a question, a prompt, or the like is received. In some embodiments, this can include the receipt of testing content, and the storing of the testing content in one of the databases 104 such as, for example, the content library database 303.

After the test has been received, the process 1200 proceeds to block 1204, wherein log-in information for a plurality of users is received. In some embodiments, this information can be received as part of the initiation of testing, and the log-in information can be received by, for example, the content management server 102 from one or several of the user devices 106.

After the log-in information has been received, the process 1200 proceeds to block 1206, wherein the content is provided to some or all of the plurality of users. In some embodiments, this can include the retrieval of the content from one of the databases 104, and providing the content to the user device(s) 106 being used by the some or all of the plurality of users.

After the content has been provided to the plurality of users, the process 1200 proceeds to block 1208, wherein a feedback connection is established. In some embodiments, this can include establishing a communication connection between one or several of the user devices 106 and the error server 119, that is separate from the communication connection via which the content was provided to the user devices 106 and in some embodiments, the feedback connection can be established via the communication connection through which the content was provided to the user devices 106.

After the feedback connection has been established, the process 1200 proceeds to block 1210, wherein a feedback communication is received. The feedback communication can be received by the error server 119. After the feedback communication has been received, the process 1200 proceeds to block 1212, wherein user result data such as, for example, test result data is received. The user result data can include data identifying, for example, a score achieved by the student-user, an identification of test questions that were correctly answered, an identification of test questions that were incorrectly answered, information relating to the time taken for completion of the test and/or for responding to some or all of the test questions.

After the user result data has been received, the process 1200 proceeds to block 1214, wherein the historical performance data is retrieved. In some embodiments, this historical data can be relevant to the current testers and/or to previous testers. In some embodiments, this data can include data relating to previous test results of current users. In some embodiments, this data can include information relating to previous user scores and/or how the previous users' scores were affected by one or several errors occurring during the test. This data can be retrieved from the database 104, and specifically can be retrieved from the user profile database 301.

After the historical performance data has been retrieved, the process 1200 proceeds to block 1216, wherein one or several student experience cohorts are identified. In some embodiments, a student experience cohort can comprise a group of students who experienced a similar error type during an electronic communication. In some embodiments, a student experience cohort can be further defined by the subject matter of the electronic communication, and thus can include a group of students who experienced a similar type of error during a similar electronic communication.

In some embodiments, the step of block 1216 can further include identifying one or several user experience cohorts that are relevant to one or several of the current users. This identification can include grouping one or several of the current users into a cohort based on error correspondence and/or correspondence between the electronic communication and/or the subject matter of the electronic communications. And then identifying the correspondence between the group of one or several of the current users and one or several of the user experience cohorts.

After the user experience cohorts have been identified, the process 1200 proceeds to block 1218, wherein an expected user performance score is generated. In some embodiments, the expected user performance score can identify the expected outcomes of the users in one or several of the user experience cohorts. This expected user performance score can be based on past user performance and/or on performance in parts of the current test not affected by the error.

After the expected user performance score has been generated, the process 1200 proceeds to block 1220, wherein a deviation from the expected score is identified. This deviation can be identified by comparing a user's actual score to the user's expected user performance score. After the deviation has been identified, the process 1200 proceeds to block 1222, wherein the significance of this deviation can be identified. The deviation can characterize the degree to which the actual tester score deviates from the user's expected user performance score. In some embodiments, the significance of this deviation can be identified according to one or several statistical methods.

After the significance of the deviation is identified, the process 1200 proceeds to block 1224, wherein an experience adjustment value is identified. In some embodiments, the experience adjustment value can be a characterization of the effect of the error on the user's performance, and can identify a degree to which the user's score should be modified to compensate for the error. In some embodiments, the adjustment value can be configured to improve the user's score based on the error.

After the adjustment value has been generated, the process 1200 proceeds to block 1226, wherein the score of the user, for whom the adjustment value was generated, is modified with the adjustment value. In some embodiments, this modified score can be stored in the database 104, and can be specifically stored in the user profile database 301. Further, in some embodiments, this modified score can be provided to one or several users.

Figure 13:
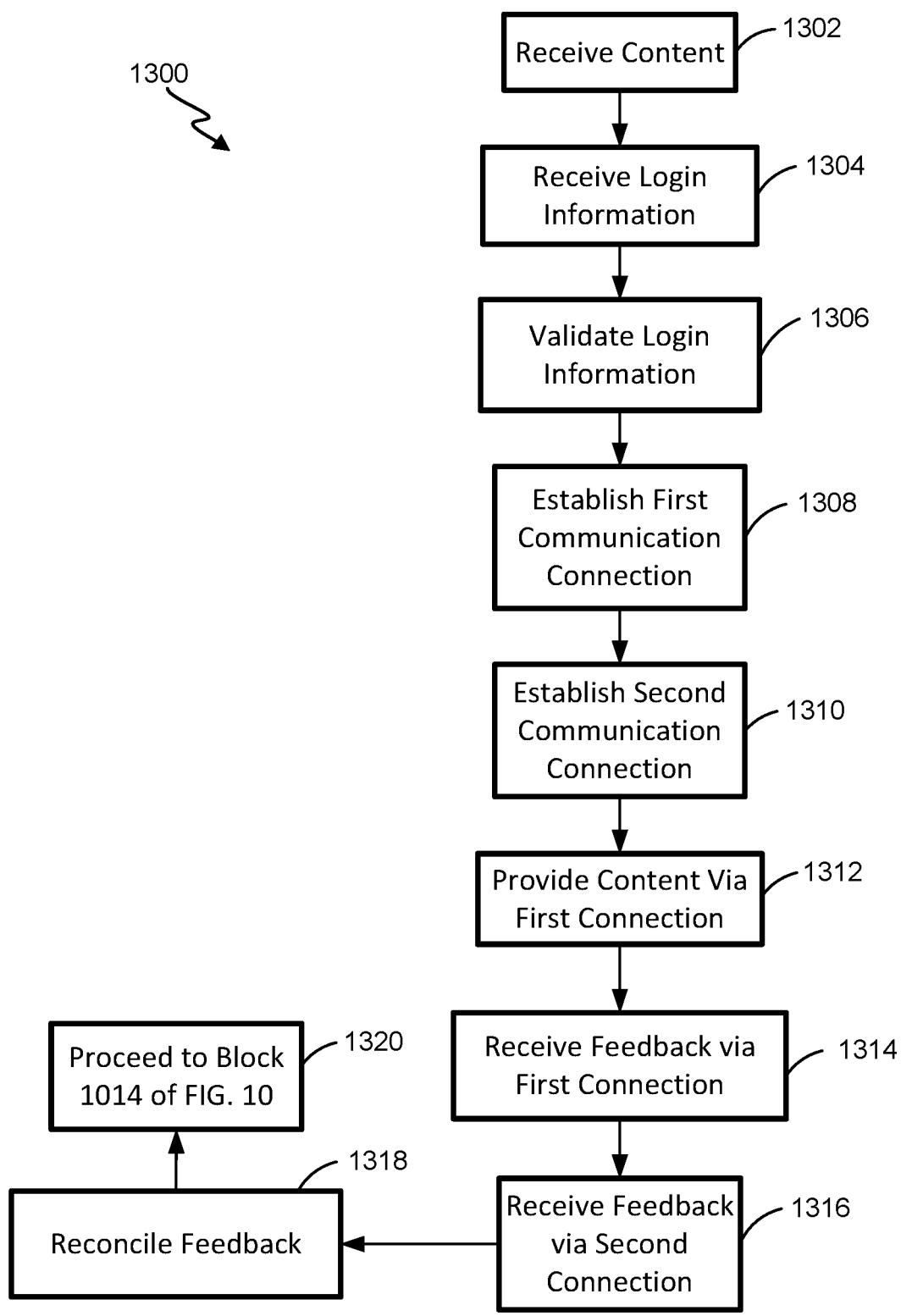
FIG. 13 is a flowchart illustrating one embodiment of a process for receiving electronic communication system performance feedback.

With reference now to FIG. 13, a flowchart illustrating one embodiment of a process 1300 for receiving electronic communication system performance feedback is shown. The process 1300 begins at block 1302, wherein content such as a test is received. In some embodiments, this can include the receipt of testing content, and the storing of the testing content in one of the databases 104 such as, for example, the content library database 303.

After the content has been received, the process 1300 proceeds to block 1304, wherein log-in information for a plurality of users is received. In some embodiments, this information can be received as part of the initiation of testing, and the log-in information can be received by, for example, the content management server 102 from one or several of the user devices 106. After the log-in information is received, the process 1300 proceeds to block 1306, wherein the log-in information is verified.

After the log-in information is verified, the process 1300 proceeds to block 1308, wherein a first communication connection is established. In some embodiments, the first communication connection can be between a first server such as, for example, the content management server 102, and one or several of the user devices 106. After the first communication connection has been established, the process 1300 proceeds to block 1310, wherein a second communication connection is established. In some embodiments, the second communication connection can be established between a second server such as, for example, the error server 119, and the one or several of the user devices 106 connected to the first server via the first communication connection.

After the second communication connection has been established, the process 1300 proceeds to block 1312, wherein the content such as the test and/or testing content is provided to the one or several user devices 106 via the first communication connection. This can include the transmission of electrical signals from the first server to the one or several user devices 106.

After the content has been provided, the process 1300 proceeds to block 1314, wherein a feedback communication is received via the first communication connection. In some embodiments, the feedback communication can be received by the first server. In some embodiments, the feedback communication can include data identifying, for example, one or several errors in the communication of the content, the error-free communication of the content, or the like. In some embodiments, the feedback communication received via the first connection can comprise on or several answers from, for example, the users of the user devices 106 that received content in block 1312.

After the feedback communication has been received via the first communication connection, the process 1300 proceeds to block 1316, wherein the feedback communication is received via the second communication connection. In some embodiments, the feedback communication can be received by the error server 119. In some embodiments, the feedback received by the second connection can comprise the same data as contained in the feedback received via the first connection. In some embodiments, the feedback received by the second connection can comprise different data than contained in the feedback received via the first connection. In some embodiments, for example, the feedback received via the first connection can comprise answer data in response to test content, and the feedback received via the second connection does not include answer data. In some embodiments, the feedback received via one or both of the first connection and the second connection can comprise error data.

After the feedback has been received via the second communication connection, the process 1300 proceeds to block 1318, wherein the feedback is reconciled. In some embodiments, this can include identifying one or several error messages received via only one of the first and second communication connections. This reconciliation can, in some embodiments, indicate whether both the first and second connections received the same error messages. In some embodiments, this redundancy can facilitate in identifying one or several errors arising in the first connection. After the feedback has been reconciled, the process 1300 proceeds to block 1320, and continues with block 1014 of FIG. 10.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system, comprising:
a database storing a plurality of detected errors, and
a server, comprising a computing device coupled to a network and comprising at least one processor executing instructions within a memory which, when executed, cause the system to:
receive:
an attribute data identifying an attribute of a client device coupled to the network; and:
an error message associated with an electronic communication between the server and the client device;
identify, using a comparison of the error message to the plurality of detected messages and the attribute data, a trend within a plurality of error messages including the error message;
generate, using the trend, an adjustment value with which testing scores of students can be adjusted;
generate an adjusted testing score by adjusting, using the adjustment value, a testing score of a student associated with the user device; and
store the adjusted testing score in the database.

2. The system of claim 1, wherein the instructions further cause the system to identify, a location data within the attribute data, wherein the location information identifies the location of each of a plurality of user devices.

3. The system of claim 1, wherein the electronic communication comprises at least one test communication.

4. The system of claim 3, wherein the at least one test communication comprises at least one question and at least one response to the at least one question.

5. The system of claim 1, wherein the instructions further cause the system to identify, within the attribute data, a hardware data identifying at least one hardware of each of a plurality of client devices.

6. The system of claim 5, wherein the instructions further cause the system to execute a software logic within the attribute data, which identifies a software running on each of the plurality of client devices.

7. The system of claim 6, wherein the instruction further cause the system to:
generate an event log storing the attribute data, the event log identifying operations performed by each of the plurality of client devices before the error message associated with the electronic communication was received by the server; and
identify the software running on each of the plurality of user devices at a time the error message associated with the electronic communication was received by the server.

8. The system of claim 1, wherein the instructions further cause the system to generate and transmit an alert to the client device, wherein the alert is sent from the server to the client device.

9. The system of claim 8, wherein the instruction further cause the system to launch, within the client device in response to the alert, an application displaying data contained in the alert.

10. A method, comprising:
storing, by a server, comprising a computing device coupled to a network and comprising at least one processor executing instructions within a memory, a plurality of detected errors in a database coupled to the network;
receiving, by the server:
an attribute data identifying an attribute of a client device coupled to the network; and:
an error message associated with an electronic communication between the server computer and the client device;
identifying, by the server using a comparison of the error message to the plurality of detected messages and the attribute data, a trend within a plurality of error messages including the error message;
generating, by the server using the trend, an adjustment value with which testing scores of students can be adjusted;
generating, by the server, an adjusted testing score by adjusting, using the adjustment value, a testing score of a student associated with the user device; and
storing, by the server, the adjusted testing score in the database.

11. The method of claim 10, further comprising the step of identifying, by the server, a location data within the attribute data, wherein the location information identifies the location of each of a plurality of user devices.

12. The method of claim 10, wherein the electronic communication comprises test communications including a plurality of questions and a plurality of responses to the plurality of questions.

13. The method of claim 10, further comprising the step of identifying, by the server within the attribute data, a hardware data identifying at least one hardware of each of a plurality of client devices.

14. The method of claim 13, further comprising the step of executing, by the server, a software logic within the attribute data, which identifies a software running on each of the plurality of client devices.

15. The method of claim 14, further comprising the steps of:
generating, by the server, an event log storing the attribute data, the event log identifying operations performed by each of the plurality of client devices before the error message associated with the electronic communication was received by the server; and identifying, by the server, the software running on each of the plurality of user devices at a time the error message associated with the electronic communication was received by the server.

16. A method, comprising:
receiving, by a first server comprising a computing device coupled to a network and comprising at least one processor executing instructions within a memory, an error message associated with an electronic communication between a second server and a client device;
identifying, by the first server using a comparison of the error message to a plurality of detected messages stored in a database, a trend within a plurality of error messages including the error message;
generating, by the first server using the trend, an adjustment value with which testing scores of students can be adjusted;
transmitting, by the first server, the adjustment value to the second server.

17. The method of claim 16, wherein the electronic communication comprises test communications including a plurality of questions and a plurality of responses to the plurality of questions.

18. The method of claim 16, further comprising the step of identifying, by the server within an attribute data stored in the database, a hardware data identifying at least one hardware of each of a plurality of client devices.

19. The method of claim 18, further comprising the step of executing, by the server, a software logic within the attribute data, which identifies a software running on each of the plurality of client devices.

20. The method of claim 19, further comprising the steps of:
generating, by the server, an event log storing the attribute data, the event log identifying operations performed by each of the plurality of client devices before the error message associated with the electronic communication was received by the server; and
identifying, by the server, the software running on each of the plurality of user devices at a time the error message associated with the electronic communication was received by the server.

\* \* \* \* \*